United States Patent

Sato et al.

[15] 3,665,309
[45] May 23, 1972

[54] TIME INTERVAL MEASURING INSTRUMENT
[72] Inventors: Shosuke Sato, Tokyo; Shigeru Saito, Yokohama; Saburo Kobayashi, Tokyo, all of Japan
[73] Assignee: Kabushiki Kaisha Tokyo Keiki Seizosho (Tokyo Keiki Seizosho Co., Ltd.), Tokyo, Japan
[22] Filed: May 6, 1970
[21] Appl. No.: 35,001

[30] Foreign Application Priority Data
May 14, 1969 Japan..................................44/36691

[52] U.S. Cl..................................................324/186
[51] Int. Cl...................................G04f 9/00, G04f 11/06
[58] Field of Search.........................324/186, 83 D, 187

[56] References Cited
UNITED STATES PATENTS
3,537,003  10/1970  Planta et al..........................324/186

*Primary Examiner*—Alfred E. Smith
*Attorney*—Hill, Sherman, Meroni, Gross & Simpson

[57] ABSTRACT

An instrument for measuring the time interval between first and second signals of the same period having a gate circuit for permitting the passage therethrough of a counting pulse controlled by a first pulse synchronized with the first signal in phase, a first counter for pulse derived from the gate circuit, a second counter capable of reversible counting another pulse, a detector circuit detecting agreement of the outputs of the first and second counter, means controlling the gate circuit to inhibit the passage therethrough of the pulse of the first counter based upon the output of the detector circuit, means producing a second pulse based upon the output of the detector circuit, and means stopping the operation of the second counter when the second pulse is in phase with the second signal, whereby the time interval between the first and second pulses is obtained when the second counter is in its inoperative condition.

6 Claims, 16 Drawing Figures

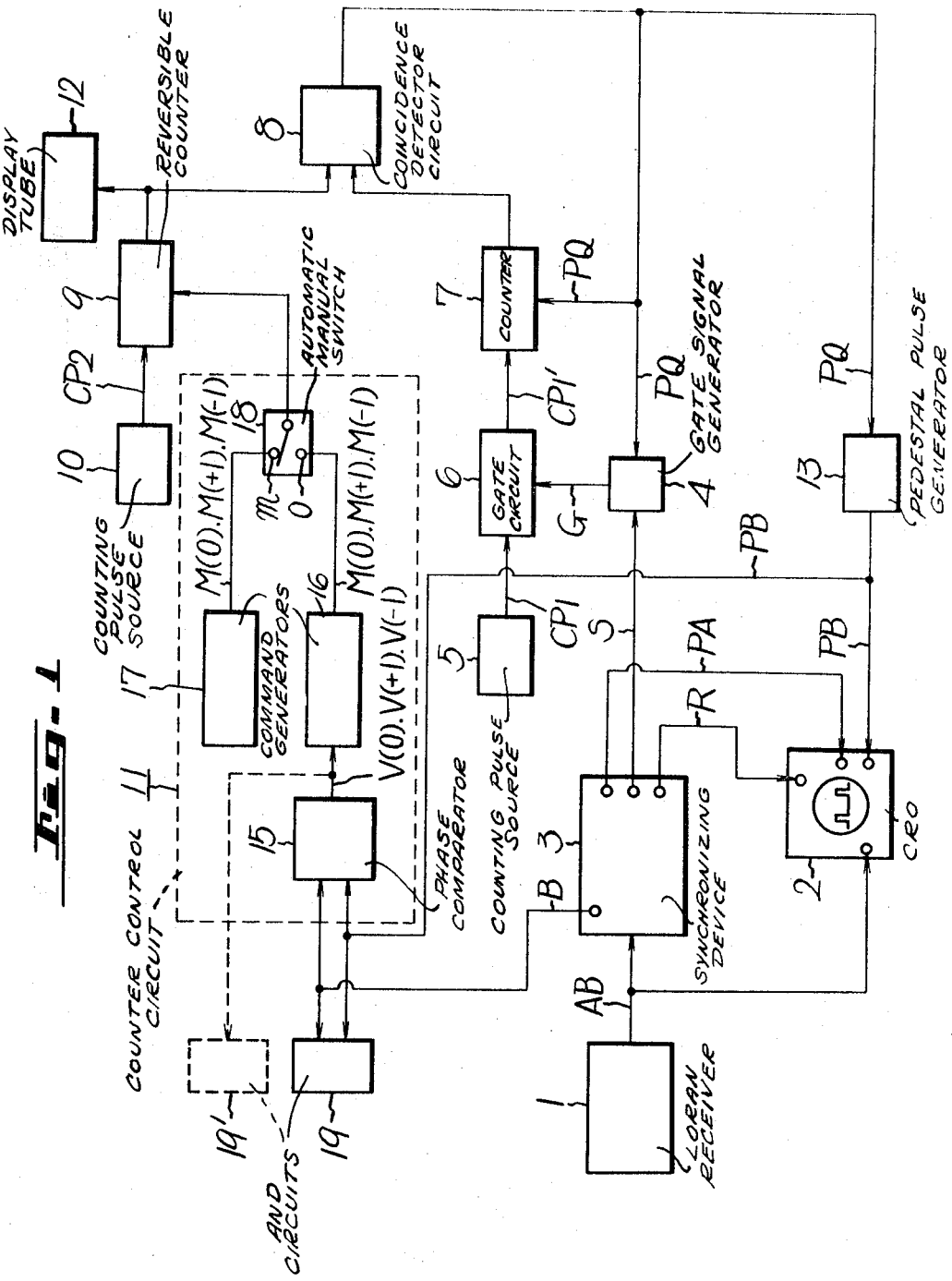

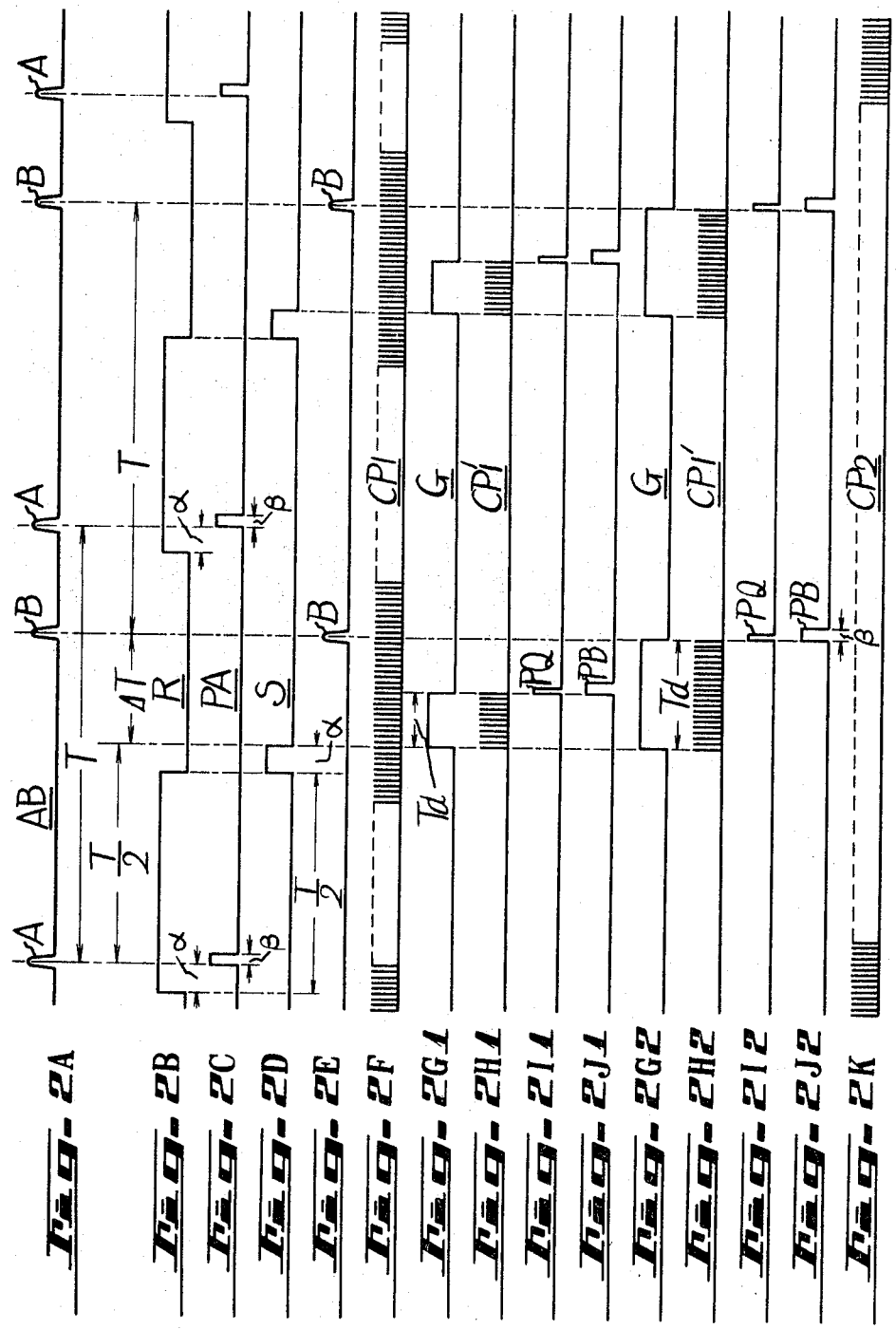

TIME INTERVAL MEASURING INSTRUMENT

BACKGROUND OF THE INVENTION

1. Field of the Invention

This invention relates to a time interval measuring instrument for measuring the time interval between two signals having substantially the same period, and more particularly to a time interval measuring instrument which is suitable for use in loran receivers.

2. Description of the Prior Art

Loran receivers are required to receive master and slave loran signals and measure the time interval between the two signals. In order to measure the time interval various time interval measuring instruments have been proposed for use with the loran receivers but they involve considerable complexity in construction and do not allow ease in either of manual and automatic measurements of the time intervals between the two signals.

SUMMARY OF THE INVENTION

Accordingly, the primary object of this invention is to provide a novel time interval measuring instrument for loran receivers which is extremely simple in construction but is capable of measuring the time interval between master and slave loran signals with high precision.

Another object of this invention is to provide a novel time interval measuring instrument with which the time interval between two signals can be readily measured by either of manual and automatic operations at any times.

Other objects, features and advantages of this invention will become apparent from the following description taken in conjunction with the accompanying drawings.

BRIEF DESCRIPTION OF THE DRAWINGS

FIG. 1 is a systematic block diagram showing one example of the time interval measuring instrument of this invention as applied to a loran receiver, and FIG. 2 is a signal wave-form diagram for explaining the operation of the instrument exemplified in FIG. 1.

DESCRIPTION OF THE PREFERRED EMBODIMENTS

A description will hereinafter be given of this invention as applied to a loran receiver.

In FIG. 1 reference numeral 1 indicates a receiver which receives master and slave loran signals and which delivers a loran signal AB such as shown in FIG. 2A which includes master and slave loran pulses A and B. The periods of the master and slave loran pulses A and B of the loran signal AB are equal to each other and indicated by T. The slave loran pulse B is delayed behind the master loran pulse A by $(T/2 + \Delta T)$, $\Delta T$ representing a time to be measured as the time interval between the master and slave loran signals A and B.

Such a received signal AB is then supplied to a cathode ray tube display device 2 as usual and, at the same time, is applied to a synchronizing device 3.

The synchronizing device 3 delivers a rectangular wave R such as shown in FIG. 2B which has the same period T as that of the received loran signal AB and a pulse width T/2 and is slightly advanced in phase relative to the master loran pulse A by a time $\alpha$. Device 3 also produces a pedestal pulse PA such as depicted in FIG. 2C which is delayed behind the starting time of the rectangular wave R by the time $\alpha$ and has a pulse width $\beta$ and a period T. Device 3 also delivers a timing pulse S such as illustrated in FIG. 2D which rises at the terminating time of the rectangular wave R and has a pulse width $\alpha$ and a period T. Device 3 also delivers slave loran pulse B of the received loran signal AB such as shown in FIG. 2E. Let it be assumed in this case that the pedestal pulse PA is synchronized in phase with the master loran pulse A.

The rectangular wave R is supplied from the synchronizing device 3 to the cathode ray tube display device 2 as usual to control the horizontal sweep of the cathode ray tube based on the rectangular wave R and the pedestal pulse PA is also supplied to the cathode ray tube display device 2, whereby a pulse based on the master loran pulse A of the received loran signal AB is displayed superimposed on the pedestal pulse PA.

Since the construction above described is well-known in the art, no further detailed description will be given. In the present invention the timing pulse S is applied as a setting trigger pulse to a gate signal generator circuit 4 from the synchronizing device 3. The gate signal generator circuit 4 is also supplied with coincidence detecting pulses PQ such as shown in FIGS. 2I1 and 2I2, as trigger pulses for resetting circuit 4, which are derived from a coincidence detector circuit 8 to be described later. Generator 8 produces gate signals G such as depicted in FIGS. 2G1 and 2G2 which are rectangular waves, each having a duration time Td between the terminating time of the pulse S and the starting time of the pulse PQ.

The gate signals G control a gate circuit 6 supplied with a counting pulse CP1 from a counting pulse source 5, by which the gate circuit 6 permits the passage of the pulse CP1 for a period of time Td corresponding to the pulse width of the gate signals G as shown in FIGS. 2H1 and 2H2, thus deriving from the gate circuit 6 counting pulses CP1' such as depicted in FIGS. 2H1 and 2H2.

The counting pulses CP1' derived from the gate circuit 6 are supplied to a counter 7 and are counted and the resulting output is applied to the coincidence detector circuit 8.

The coincidence detector circuit 8 is also supplied with a counted output from a reversible counter 9. The reversible counter 9 is supplied with a series of counting pulses CP2 such as shown in FIG. 2K from a counting pulse source 10 and a command signal from a counter control circuit 11 which will be described later. This circuit controls the reversible counter 9 to achieve addition or subtraction of the counting pulses CP2 or stop such addition or subtraction.

The counted output of the reversible counter 9 is applied to a number display tube 12 such, for example, as a Nixie Tube (Trademark) and the display is calibrated in time.

When the counted outputs of the counter 7 and the reversible counter 9 are the same, the coincidence detector circuit 8 provides a coincidence detecting pulse PQ such as depicted in FIGS. 2I1 and 2I2.

The coincidence detecting pulse PQ is applied as a reset trigger pulse to the gate signal generator circuit 4 as previously described. Further, the pulse PQ is fed as a reset pulse to the counter 7 to clear the content of the counter 7, and reset the counter 7. In addition, the pulse PQ is also supplied to a pedestal pulse generator circuit 13, and the circuit 13 produces a pedestal pulse PB such as shown in FIGS. 2J1 and 2J2 which rises at the same time as the coincidence detecting pulse PQ and has the same pulse width $\beta$ as that of the pedestal pulse PA. The pedestal pulse PB is supplied to the cathode ray tube device 2 to provide a pedestal display thereon.

The pedestal pulse PB is also supplied to the aforementioned counter control circuit 11. The counter control circuit 11 includes a phase comparator circuit 15 which compares the phase of the slave pulse B of the received signal AB derived from the aforementioned synchronizing device 3 to the phase of the pedestal pulse PB. The phase comparator circuit 15 produces a phase coincidence output V(0) defined by, for example, zero voltage when the above two pulses are in phase with each other, a phase advance output V(+1) defined by, for example, a positive voltage when the pedestal pulse PB is ahead of the slave pulse B in phase and a phase delay output V(−1) defined by, for example, a negative voltage when the pedestal pulse PB is delayed in phase behind the slave pulse B.

Further, the counter control circuit 11 includes two command signal generator circuits 16 and 17. The circuit 16 is an automatic command signal generator circuit which is supplied with the outputs V(0), V(+1) and V(−1) from the phase comparator circuit 15. In the event that the output of the phase comparator circuit 15 is V(0) which occurs when the pedestal pulse PB and the slave pulse B are in phase with each other, the automatic command signal generator circuit 16 derives a stop command signal M (0), defined, for example, by zero voltage. When the output of the circuit 15 is V (+1) which occurs when the pedestal pulse PB is ahead in phase of the pulse B, the circuit 16 produces an addition command signal M (+1) defined, for example, by a positive voltage. When the output of the circuit 15 is V (−1) which occurs when the pedestal pulse PB is delayed in phase behind the slave pulse B, the circuit 16 produces a subtraction command signal M (−1) defined, for example, by a negative voltage. The other command signal generator circuit 17 is a manual command signal generator circuit, which is manually operated to produce stop, addition and subtraction command signals M (0), M (+1) and M (−1) similar to those derived from the automatic command signal generator circuit 16.

The counter control circuit 11 further includes an automatic-manual changeover switch 18. The outputs M (0), M (+1) and M (−1) of the manual and automatic command signal generator circuits 16 and 17 are respectively supplied to the reversible counter 9 through a manual operation contact $m$ and an automatic operation contact O of the changeover switch 18.

When supplied with the addition and subtraction command signals M (+1) and M (−1) respectively, the reversible counter 9 performs adding and subtracting counts of the count pulse CP2 respectively and when supplied with the stop command signal M (0) the counter 9 stops the counting operation.

Reference numeral 19 in FIG. 1 indicates an information circuit of the "AND" circuit construction, which is supplied with the slave pulse B derived from the synchronizing device 3 and the pedestal pulse PB from the pedestal pulse generator circuit 13 and delivers a message when these two pulses are simultaneously applied thereto and have the phase.

Assuming in the above embodiment that the changeover switch 18 is held on the manual operation contact $m$ and that the stop command signal M (0) is derived from the manual command signal generator circuit 17 but that the time interval indicated on the indicator 12 based upon the counted output of the counter 9 is not representative of the time interval between the master and slave pulses A and B and consequently is not based upon the time ΔT but is smaller, the coincidence detecting pulse PQ produced by the coincidence detector circuit 8 as previously described will be ahead in phase of the slave pulse B as depicted in FIG. 2I1, and the pedestal pulse PB will also be ahead in phase of the slave pulse B and pulse PB will be supplied to the cathode ray tube device 2 to indicate this.

If, the addition command signal M (+1) is produced by manual operation of the manual command signal generator circuit 17 and is then applied to the reversible counter 9, the reversible counter 9 count and adds the counting pulse CP2 derived from the counting pulse source 10 and the number counted increases and the time at which the detecting pulse PQ is produced by the coincidence detector circuit 8 shifts to the right relative to FIG. 2 resulting in the width Td of the gate signal G to increase an amount corresponding to the increase in the number of pulse CP1' derived from the gate circuit 6 and also increases the counted output of the counter 7. As a result, the pedestal pulse PB moves towards the slave pulse B. This is also indicated on the cathode ray tube of the cathode ray tube device 2. Therefore, if the stop command signal M (0) is obtained by the manual operation of the manual command signal generator circuit 17 when the pedestal pulse PB exactly agrees with the slave pulse B on the cathode ray tube, the pedestal pulse PB and the slave pulse B can be obtained at exactly the same time and this condition is maintained as may be seen in FIGS. 2J2 and 2A. This is also indicated on the cathode ray tube.

The width Td of the gate signal G at this time corresponds to ΔT to be measured as depicted in FIG. 2G2 and the pulse CP1' is derived from the gate circuit 6 by the count corresponding to the width Td as shown in FIG. 2H2, so that the indicator 12 correctly indicates the time interval ΔT. The indication of the time interval ΔT does not change unless either the addition command signal M (+1) or the subtraction command signal M (−1) is supplied to the reversible counter 9.

In this manner, the time interval ΔT between the master and slave pulses A and B of the received signal AB is indicated on the indicator 12.

Turning the changeover switch 18 down to its automatic operation contact O after the measurement of ΔT as above described, the automatic command signal generator circuit 16 of the counter control circuit 11 derives therefrom the stop, addition or subtraction command signal M (0), M (+1) or M (−1) dependent upon whether the output of the phase comparator circuit 15 is V (0), V (+1) or V (−1), in accordance with the phase difference between the pedestal pulse PB and the slave pulse B. Turning the changeover switch 18 down to its automatic operation contact O when the pedestal pulse PB and the slave pulse B agree in phase with each other based upon the above-described manual operation causes the automatic command signal generator circuit 16 generate the stop command signal M (0) because the output of the phase comparator circuit 15 is V (0), and the content of the reversible counter 9 remains unchanged and the time interval ΔT will be indicated on the indicator 12. When the time interval between the master and slave pulses A and B varies such as be increasing or decreasing, the phase comparator circuit 15 produces the output V (+1) or V (−1) according to the variation and the automatic command signal generator circuit 16 produces the addition or subtraction command signal M (+1) or M (−1), which causes the reversible counter 9 to count for adding or subtracting. Ultimately when the pedestal pulse PB concurs in phase with the slave pulse B the automatic command signal generator circuit 16 produces the stop command signal M (0), and the time interval ΔT between the master and slave pulses A and B is indicated by the indicator 12.

The foregoing describes the measurement of the time interval ΔT between the master and slave pulses A and B by manual operation of the manual command signal generator circuit 17 in the case where the time interval indicated on the indicator 12 is smaller than that between the master and slave pulses A and B at the start of the operation, but it will be seen that even if the time interval on the indicator is greater than that between the pulses A and B, the same results can be obtained by utilizing the subtraction command signal M (−1).

Although the foregoing description relates to the measurement of ΔT by switching on the automatic command signal generator circuit 16 after the measurement of the time interval between the master and slave pulses A and B with a manual operation, it will be apparent that ΔT can be measured by a switching on the automatic command signal generator circuit 16 before the time interval between the master and slave pulses A and B has been measured.

Further, the reversible counter 9 holds its content unchanged unless supplied with the addition or subtraction command signals M (+1) or M (−1) as previously described, so that when one or both of the master and slave stations are mounted on moving craft, if the content of the reversible counter 9 is preselected to correspond to a predetermined distance between the master and slave stations while maintaining the changeover switch 18 connected to the manual command signal generator circuit 17 and by observing the content displayed on the indicator 12 (assuming that the slave pulse B and the pedestal pulse PB do not agree in time with each other), The phase comparator circuit 15 will produce the output V (+1) or V (−1). In this case, however, when the master and slave stations have moved relative to each other and the slave pulse B and the pedestal pulse PB agree in phase with each other, the information circuit 19 produces an output, thus delivering a message that the distance between the master and slave stations corresponds to a predetermined set distance. Such a message is derived from the output V (0) produced by the phase comparator circuit 15 when the slave pulse B and the pedestal pulse PB agree in phase with each other, and the same results can be obtained by supplying the output of the phase comparator circuit 15 to another information circuit 19' as indicated by broken lines in FIG. 1 for detecting the output V (0).

In the foregoing example the counting pulse sources 5 and 10 are respectively provided for the counters 7 and 9 but it is also possible for either one of the counting pulse sources 5 and 10 to be used by both of the counters 7 and 9 when connected in common thereto.

While the present invention has been described as applied to a loran receiver, it will be understood that the invention is applicable to the measurement of time interval between any two desired signals having the same period.

It will be apparent that many modifications and variations may be effected without departing from the scope of the novel concepts of this invention.

We claim as our invention:

1. In a craft navigation system including:
    an instrument for measuring the time interval between first and second signals having the same period and comprising a counting pulse source;
    a gate circuit means connected to said counting pulse source;
    a gate signal generator connected to said gate circuit to open it each time said first signal occurs;
    a first counter means connected to said gate circuit means;
    a second counting pulse source;
    a second counter means connected to said second counting pulse source and capable of reversible counting and settable to an arbitrary value;
    a detector circuit means connected to the outputs of said first and second counter means, the output of said detector circuit connected to said gate signal generator to inhibit the passage through said gate circuit of counting pulse to said first counter means;
    means for producing a second pulse from the output of said detector circuit means;
    stop means receiving said second pulse from said detector circuit for stopping said second counter means when the second pulse is in phase with said second signal; and
    indicator means directly receiving the output of said second counter means to indicate the content of said second counter means whereby the time interval between the first and second pulses is indicated when the second counter means is in its inoperative condition.

2. A time interval measuring instrument as claimed in claim 1 wherein said stop means includes a phase comparator circuit means for comparing in phase said second pulse with said second signal and connecting to control the counting operation of said second counter means as a function of the output of said phase comparator circuit means.

3. A time interval measuring circuit as claimed in claim 2 which includes an automatic command signal generator circuit means receiving the output of said phase comparator circuit means and connected to control the second counter means as a function of the output of said automatic command signal generator circuit means.

4. A time interval measuring instrument as claimed in claim 1 including a manual control means for controlling the counting operation of said second counter means by manual operation.

5. A time interval measuring instrument as claimed in claim 1 which includes a manual control means for controlling the counting operation of said second counter means by manual operation, a phase comparator circuit means for comparing the phase of said second pulse with said second signal, automatic control means for automatically controlling the counting operation of said second counter means with the output of said phase comparator circuit means, and switch means for connecting said manual and automatic control means to said second counter means.

6. A time interval measuring instrument as claimed in claim 1 wherein said first and second counting pulse sources are obtained from a single generator.

* * * * *